(12) United States Patent  
Cho et al.

(10) Patent No.: US 11,516,332 B2  
(45) Date of Patent: Nov. 29, 2022

(54) WATCH PHONE AND METHOD FOR HANDLING AN INCOMING CALL IN THE WATCH PHONE

(71) Applicant: SAMSUNG ELECTRONICS CO., LTD., Suwon-si (KR)

(72) Inventors: Shi-Yun Cho, Seoul (KR); Ji-Hyun Jung, Seongnam-si (KR); Ho-Jin Lee, Suwon-si (KR); Young-Min Lee, Yongin-si (KR); Ho-Seong Seo, Suwon-si (KR); Youn-Ho Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 326 days.

(21) Appl. No.: 15/811,570

(22) Filed: Nov. 13, 2017

(65) Prior Publication Data

US 2018/0069956 A1 Mar. 8, 2018

Related U.S. Application Data

(63) Continuation of application No. 12/631,298, filed on Dec. 4, 2009, now abandoned.

(30) Foreign Application Priority Data

Dec. 4, 2008 (KR) .................. 10-2008-0122488

(51) Int. Cl.
*G06F 1/16* (2006.01)
*G06F 3/0488* (2022.01)
(Continued)

(52) U.S. Cl.
CPC ............ *H04M 1/724* (2021.01); *G06F 1/163* (2013.01); *G06F 3/0488* (2013.01); *H04B 1/385* (2013.01); *H04M 2250/22* (2013.01)

(58) Field of Classification Search
CPC .... G06F 3/04812; G06F 3/017; G06F 3/0488; G06F 3/04883; G06F 2203/04808;
(Continued)

(56) References Cited

U.S. PATENT DOCUMENTS 5,477,508 A 12/1995 Will
5,552,779 A 9/1996 Gaskill et al.
(Continued)

FOREIGN PATENT DOCUMENTS

DE 195 28 734 2/1997
DE 102008029847 12/2009
(Continued)

OTHER PUBLICATIONS

David Pogue, "iPhone, The Missing Manual, 2nd edition", Aug. 2008, O'Reilly Media, Inc., pp. 1-4.*

(Continued)

*Primary Examiner* — Jennifer N Welch
*Assistant Examiner* — K C Chen
(74) *Attorney, Agent, or Firm* — Nixon & Vanderhye, P.C.

(57) ABSTRACT

A watch phone and a method for handling an incoming call using the watch phone are provided. In the watch phone, a display device includes a touch screen panel and a display, turns off the touch screen panel in a watch mode, turns on the touch screen panel in an idle mode or upon receipt of an incoming call, and displays at least two areas for call connection and call rejection, upon receipt of the incoming call. A single mode selection key selects one of the watch mode and the idle mode. A controller performs control operations so that the touch screen panel is turned off in the watch mode and is turned on in the idle mode or upon receipt of the incoming call, and connects or rejects the incoming call, when the at least two areas for call connection or call (Continued)

rejection, which are displayed upon receipt of the incoming call, are pointed to or dragged to.

13 Claims, 5 Drawing Sheets

(51) Int. Cl.
  *H04M 1/724* (2021.01)
  *H04B 1/3827* (2015.01)
(58) Field of Classification Search
  CPC ...... G06F 1/163; G06F 1/1626; G06F 1/1643; G06F 3/041; G06F 3/14; G09G 2340/145; H04M 1/72519; H04M 2250/22; H04M 1/72522; H04M 1/724; H04M 1/72403; H04B 1/385
  See application file for complete search history.

(56) References Cited

U.S. PATENT DOCUMENTS

| | | | |
|---|---|---|---|
| 5,758,295 | A | 5/1998 | Ahlberg et al. |
| 5,892,455 | A | 4/1999 | Matsumoto |
| 6,377,685 | B1 | 4/2002 | Krishnan |
| 6,720,860 | B1 | 4/2004 | Narayanaswami |
| 6,785,560 | B1 | 8/2004 | Chow et al. |
| 7,254,219 | B1 | 8/2007 | Hansen |
| 8,145,196 | B2 | 3/2012 | Wood et al. |
| 9,152,309 | B1* | 10/2015 | Arréhn ............... G06F 3/0488 |
| 2002/0034293 | A1 | 3/2002 | Horowitz |
| 2002/0191029 | A1 | 12/2002 | Gillespie |
| 2003/0023353 | A1 | 1/2003 | Badarneh |
| 2003/0123626 | A1 | 7/2003 | Beckmann et al. |
| 2004/0266426 | A1 | 12/2004 | Marsh |
| 2005/0043063 | A1 | 2/2005 | Dinn |
| 2005/0079896 | A1 | 4/2005 | Kokko et al. |
| 2005/0198589 | A1 | 9/2005 | Heikes et al. |
| 2005/0253817 | A1 | 11/2005 | Rytivaara et al. |
| 2006/0010200 | A1 | 1/2006 | Mousseau et al. |
| 2006/0158439 | A1 | 7/2006 | Luo et al. |
| 2006/0189345 | A1 | 8/2006 | Suzuki et al. |
| 2006/0263068 | A1 | 11/2006 | Jung |
| 2007/0035513 | A1 | 2/2007 | Sherrard et al. |
| 2007/0087789 | A1* | 4/2007 | Lee ................... H04M 1/27475 455/566 |
| 2007/0136686 | A1 | 6/2007 | Price et al. |
| 2007/0150842 | A1 | 6/2007 | Chaudhri et al. |
| 2007/0168426 | A1 | 7/2007 | Ludwig et al. |
| 2007/0174515 | A1 | 7/2007 | Sinclair |
| 2007/0201644 | A1 | 8/2007 | Metcalf |
| 2007/0239833 | A1 | 10/2007 | Alperin et al. |
| 2008/0070648 | A1 | 3/2008 | Kang et al. |
| 2008/0122796 | A1 | 5/2008 | Jobs et al. |
| 2008/0168290 | A1 | 7/2008 | Jobs |
| 2008/0168361 | A1 | 7/2008 | Forstall |
| 2008/0168395 | A1 | 7/2008 | Ording |
| 2008/0174570 | A1 | 7/2008 | Jobs |
| 2008/0183313 | A1 | 7/2008 | Lundquist |
| 2008/0188272 | A1 | 8/2008 | Ohmoto |
| 2009/0061837 | A1 | 3/2009 | Chaudhri et al. |
| 2009/0069045 | A1 | 3/2009 | Cheng |
| 2009/0083850 | A1 | 3/2009 | Fadell et al. |
| 2009/0089683 | A1 | 4/2009 | Thapa |
| 2009/0117945 | A1 | 5/2009 | Mahler |
| 2009/0137284 | A1 | 5/2009 | Liyanaarachchi |
| 2009/0146848 | A1 | 6/2009 | Ghassabian |
| 2009/0177981 | A1 | 7/2009 | Christie |
| 2009/0199130 | A1* | 8/2009 | Tsern ............... G04G 21/08 715/810 |
| 2009/0219252 | A1 | 9/2009 | Jarventie et al. |
| 2009/0248913 | A1 | 10/2009 | Salokannel |
| 2009/0249252 | A1 | 10/2009 | Lundy et al. |
| 2009/0264156 | A1 | 10/2009 | Burghardt |
| 2009/0278806 | A1* | 11/2009 | Duarte ............... G06F 3/03547 345/173 |
| 2009/0285383 | A1* | 11/2009 | Tsuei ............... G06F 3/04883 379/242 |
| 2009/0296951 | A1 | 12/2009 | De Haan |
| 2009/0298546 | A1* | 12/2009 | Kim ............... G06F 1/1616 455/566 |
| 2010/0001967 | A1* | 1/2010 | Yoo ............... G06F 3/0488 345/173 |
| 2010/0009749 | A1 | 1/2010 | Chrzanowski, Jr. |
| 2010/0081385 | A1 | 4/2010 | Lin et al. |
| 2010/0081486 | A1 | 4/2010 | Kim |
| 2011/0025632 | A1* | 2/2011 | Lee ............... G06F 3/0482 345/173 |

FOREIGN PATENT DOCUMENTS

| | | |
|---|---|---|
| EP | 1 860 539 | 11/2007 |
| EP | 1 956 601 | 8/2008 |
| JP | 08-047025 | 2/1996 |
| KR | 20-0193130 | 8/2000 |
| KR | 100823871 | 4/2008 |
| WO | 2004/001560 | 12/2003 |

OTHER PUBLICATIONS

David Pogue, "iPHone: the Missing Manual, 2nd Edition", Aug. 13, 2008, O'Reilly Media, Inc., pp. 1-19.*
Extended Search Report dated Jun. 29, 2018 in counterpart European Patent Application No. 18165482.3.
Office Action dated Aug. 11, 2017 in parent U.S. Appl. No. 12/631,298, filed Dec. 4, 2009.

* cited by examiner

WATCH PHONE AND METHOD FOR HANDLING AN INCOMING CALL IN THE WATCH PHONE

CROSS-REFERENCE TO RELATED APPLICATIONS

This application is a continuation of U.S. application Ser. No. 12/631,298, filed on Dec. 4, 2009, now abandoned, which is based on and claims priority under 35 U.S. § 119 to Korean Patent Application No. 10-2008-0122488, filed on Dec. 4, 2008, in the Korean Intellectual Property Office. The contents of each of these applications are incorporated by reference herein in their entirety.

BACKGROUND OF THE INVENTION

1. Field of the Invention

The present invention generally relates to a watch phone and a method for performing a call using the watch phone. More particularly, the present invention relates to a watch phone including a touch screen panel and a single key, for easily performing a call and a method for performing a call using the watch phone.

2. Description of the Related Art

The demand for portable terminals with touch screen panels is continually increasing. For example, FIG. 1 illustrates a conventional portable terminal with a touch screen panel.

Referring to FIG. 1, when the portable terminal is in an idle mode, an unintended input may still be received by the touch screen panel, for example, while the portable terminal is being carried in a pocket or purse, or due to an inadvertent touching. To prevent inadvertent operations, the portable terminal further includes a touch screen locking key 90, so that the touch screen panel is kept off during the idle mode and cannot receive any inadvertent inputs.

Further, upon receipt of an incoming call in the idle mode with the touch screen panel kept off, automatic activation of the touch screen panel may still cause a wrong operation. Therefore, the touch screen panel is typically kept in the off state despite the incoming call, until intentionally activated by the user through the locking key 90.

Further, when a call is received after unlocking the touch screen, to accept or reject the incoming call, a call key 81 or an end key 82 is also provided on the portable terminal.

Accordingly, the conventional portable terminal with a touch screen panel needs at least three keys for standard operations. Further, as three or more keys are required to use the touch screen panel, the touch screen panel is not very feasible for a small-size design-oriented structure such as a watch phone.

SUMMARY OF THE INVENTION

Therefore, the embodiments of the present invention are designed to address at least the problems and/or disadvantages described above and to provide at least the advantages as will be described below. Accordingly, an aspect of the present invention is to provide a watch phone including a touch screen panel and a single key, for easily performing a call, and a method for performing a call using the watch phone.

In accordance with an aspect of the present invention, there is provided a watch phone including a touch screen panel and a display, wherein the watch phone turns off the touch screen panel in a watch mode, turns on the touch screen panel in an idle mode or upon receipt of an incoming call, and displays at least two areas for call connection or call rejection upon receipt of the incoming call. A single mode selection key selects one of the watch mode and the idle mode, and a controller performs control operations such that the touch screen panel is turned off in the watch mode and turned on in the idle mode or upon receipt of the incoming call, and such that the incoming call is connected or rejected when the at least two areas for call connection or call rejection, displayed upon receipt of the incoming call, are pointed to or dragged.

In accordance with another aspect of the present invention, there is provided a method for performing a call in a watch phone, in which a touch screen panel is turned off in watch mode and turned on in idle mode, according to a mode selection, at least two areas for call connection or call rejection are displayed. In the method, upon receipt of an incoming call in the watch mode or in the idle mode, the incoming call is connected, when the at least two areas for call connection are pointed to or dragged, and the incoming call is rejected, when the at least two areas for call rejection are pointed to or dragged.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

The matters defined in the description such as a detailed construction and elements are provided to assist in a comprehensive understanding of certain embodiments of the present invention. Accordingly, those of ordinary skill in the art will recognize that various changes and modifications of the embodiments described herein can be made without departing from the scope and spirit of the present invention. Also, descriptions of well-known functions and constructions are omitted for clarity and conciseness.

Figure 1:
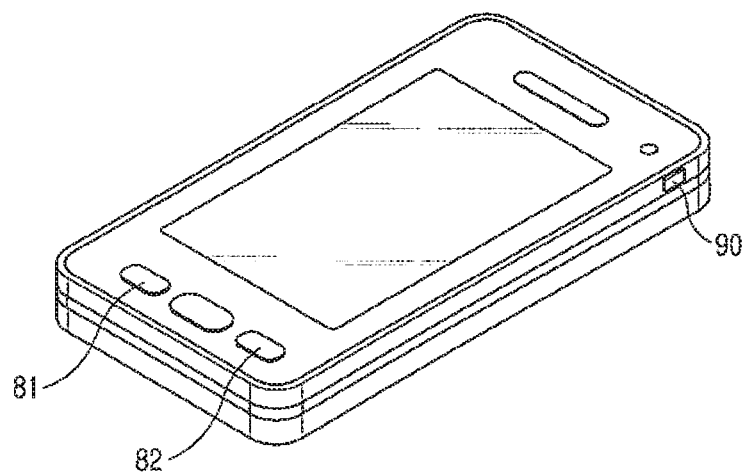
FIG. 1 illustrates a conventional portable terminal with a touch screen panel.
Figure 2:
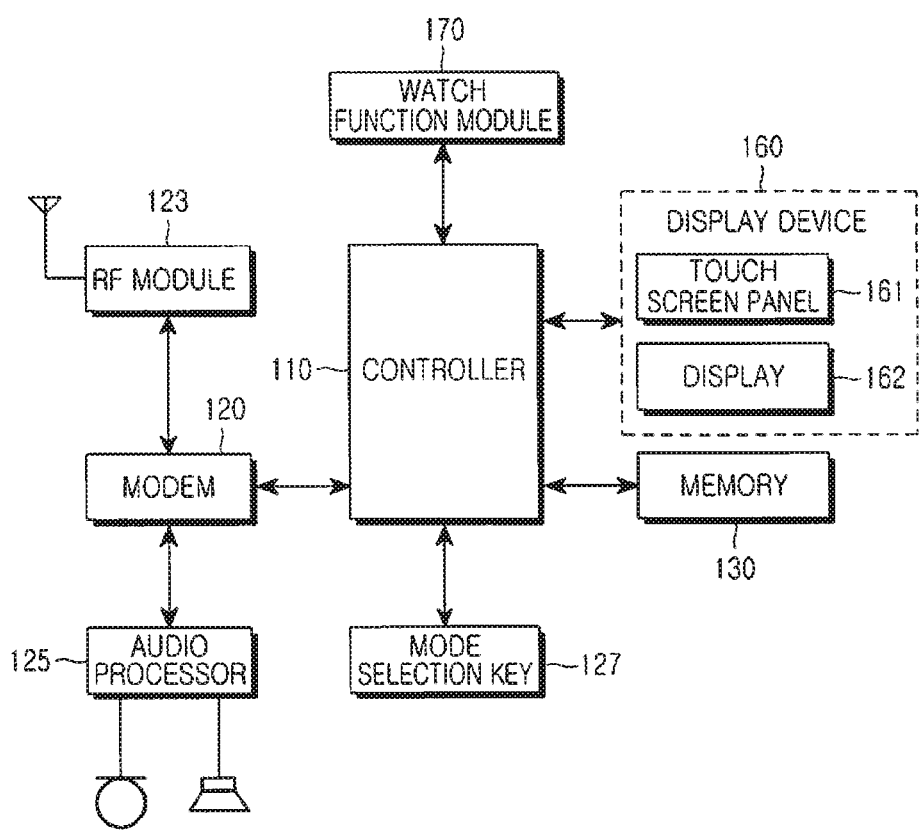
FIG. 2 is a block diagram of a watch phone including a touch screen panel according to an embodiment of the present invention.
Figure 3:
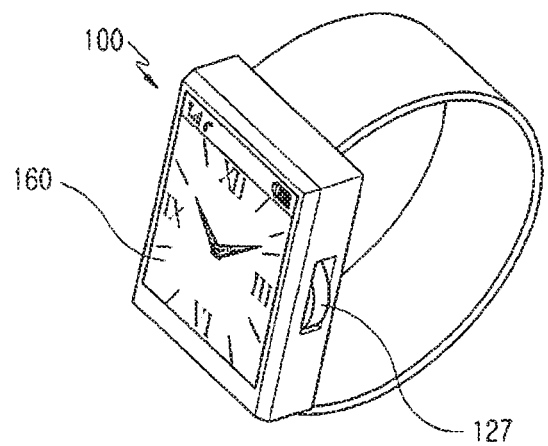
FIG. 3 illustrates a watch phone including a touch screen panel according to an embodiment of the present invention.
Figures 4A, 4B:
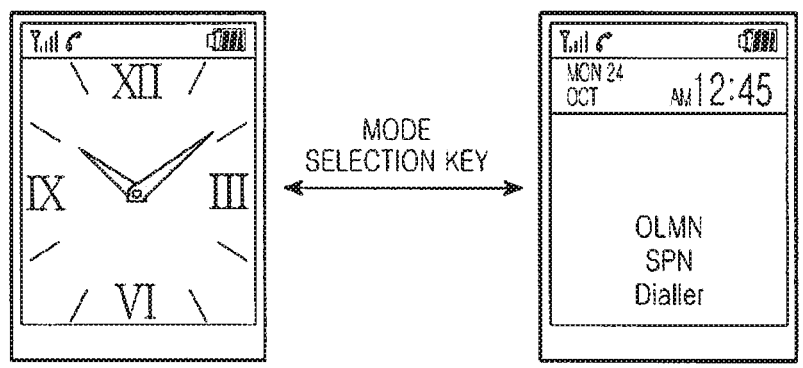
FIGS. 4A and 4B illustrate watch mode and idle mode displays in a watch phone including a touch screen panel according to an embodiment of the present invention.
Figures 5A, 5B:
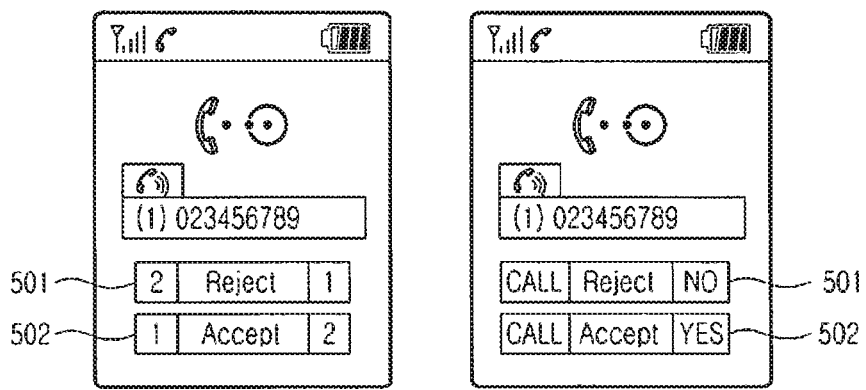
FIGS. 5A and 5B illustrate call connection and call rejection displays in a watch phone including a touch screen panel according to an embodiment of the present invention.

FIG. 2 is a block diagram of a watch phone including a touch screen panel according to an embodiment of the present invention, FIG. 3 illustrates a watch phone including a touch screen panel according to an embodiment of the present invention, FIGS. 4A and 4B illustrate watch mode and idle mode displays in a watch phone including a touch screen panel according to an embodiment of the present invention, and FIGS. 5A and 5B illustrate call connection and call rejection displays in a watch phone including a touch screen panel according to an embodiment of the present invention.

Referring to FIGS. 2 to 5B, a Radio Frequency (RF) module 123 performs a wireless communication function in the watch phone. The RF module 123 includes an RF transmitter for upconverting the frequency of a transmission signal and amplifying the upconverted transmission signal, and an RF receiver for low-noise-amplifying a received signal and downconverting the frequency of the low-noise-amplified signal.

A MODulator-DEModulator (MODEM) 120 includes a transmitter for encoding and modulating the transmission signal and a receiver for demodulating and decoding the received signal.

An audio processor 125 may form a COder-DECoder (CODEC). The CODEC commonly includes a data CODEC for processing packet data and an audio CODEC for processing an audio signal such as voice. The audio processor 125 converts a digital audio signal received from the MODEM 120 to an analog audio signal through the audio CODEC, thus reproducing the audio signal. Also, the audio processor 125 converts an analog audio signal received from a microphone to a digital audio signal through the audio CODEC and outputs the digital audio signal to the MODEM 120. The CODEC may be configured separately or incorporated into a controller 110.

A memory 130 may include a program memory and a data memory. The program memory may store programs for controlling typical operations of the watch phone and programs for controlling a call operation of the watch phone with a single key and a touch screen panel according to an embodiment of the present invention. The data memory temporarily stores data generated during executing the programs.

A display device 160 includes a touch screen panel 161 and a display 162.

The display 162 displays user data received from the controller 110. The display 162 may use a Liquid Crystal Display (LCD). Therefore, it may also include an LCD controller, a memory for storing image data, and an LCD device. The display 162 is kept on in a watch mode, in an idle mode, or upon reception of an incoming call according to an embodiment of the present invention.

Upon receipt of an incoming call in the watch phone, the display device 162 displays at least two areas 501 for call rejection and at least two areas 502 for call connection, as illustrated in FIGS. 5A and 5B.

The touch screen panel 161 acts as an input device. According to an embodiment of the present invention, if the touch screen panel 161 is placed in an off state in the watch mode, it transitions to an on state in the idle mode of the watch phone or upon receipt of an incoming call in the watch phone.

A mode selection key 127 is a single key provided on a side of the watch phone. The watch phone is switched to the watch mode as illustrated in FIG. 4A or to the idle mode as illustrated in FIG. 4B, according to the input of the mode selection key 127.

A watch function block 170 displays time on the display device 160 with the touch screen panel 161 kept off during the watch mode.

The controller 110 provides overall control to the watch phone. Alternatively, the controller 110 may include the MODEM 120 and the CODEC.

According to an embodiment of the present invention, when the watch phone is switched to the watch mode by the input of the mode selection key 127, the controller 110 turns off the touch screen panel 161 and turns on the display 162 in the watch mode. Upon receipt of an incoming call in the watch mode, the controller 110 turns on the touch screen panel 161 and keeps the display 162 on.

According to an embodiment of the present invention, when the watch phone is switched to the idle mode by the input of the mode selection key 127, the controller 110 turns on the touch screen panel 161 and the display 162 in the idle mode, and controls a function corresponding to a menu selected from the on-state touch screen panel 161 to be performed.

According an embodiment of the present invention, upon receipt of an incoming call in the watch mode or idle mode, the controller 110 alerts a user of the incoming call. If the at least two areas 502 for call connection are pointed to or a drag happens between the at least two areas 502 on the display device 160, the controller 110 controls the call to be connected.

According to an embodiment of the present invention, upon receipt of an incoming call in the watch mode or idle mode, the controller 110 alerts a user of the incoming call. If the at least two areas 501 for call rejection are pointed to or a drag happens between the at least two areas 501 on the display device 160, the controller 110 controls the call to be rejected.

Figure 6:
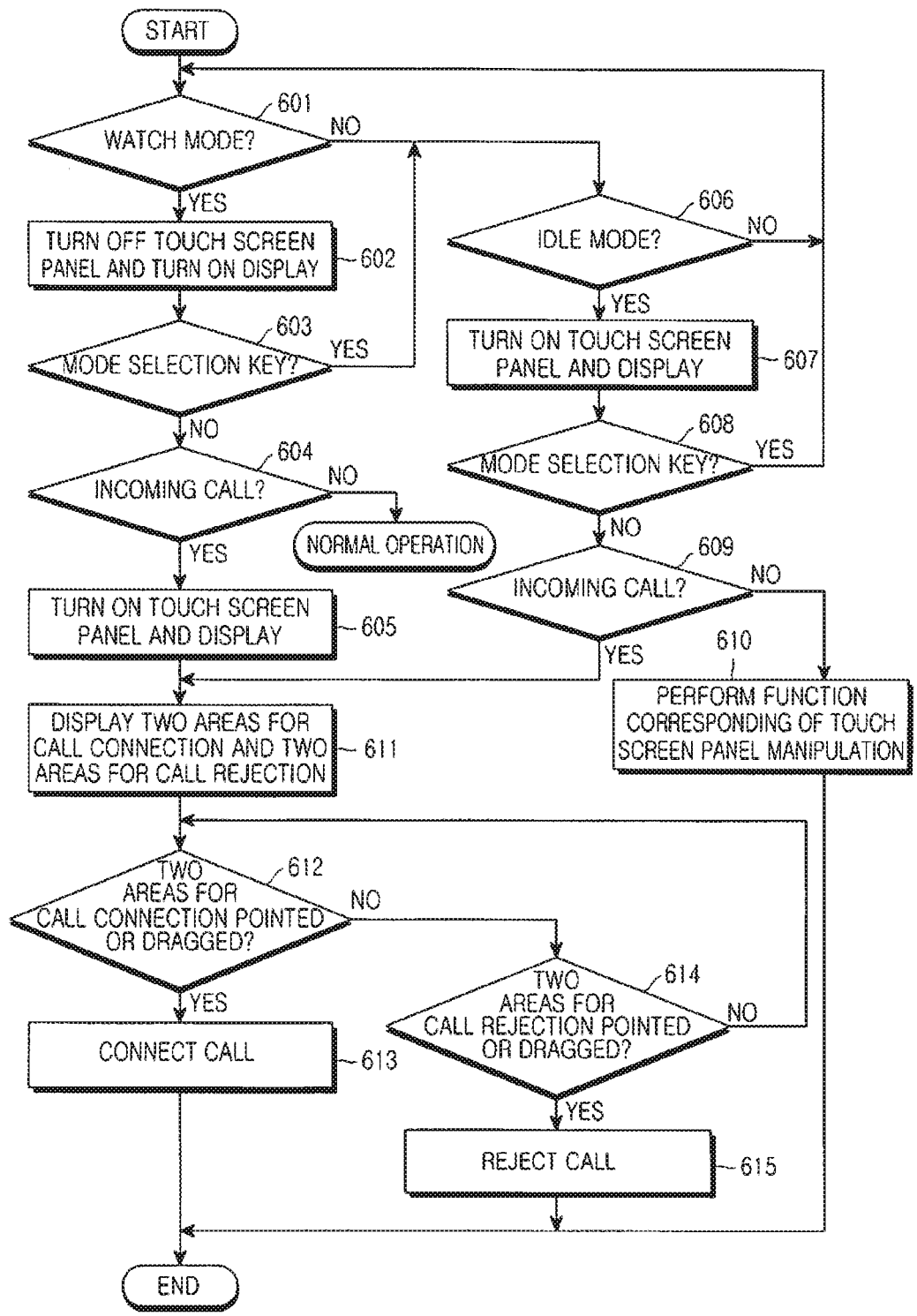
FIG. 6 is a flowchart illustrating a call operation in a watch phone including a touch screen panel according to an embodiment of the present invention.

FIG. 6 is a flowchart illustrating a call operation in a watch phone including a touch screen panel according to an embodiment of the present invention.

Referring to FIG. 6, when the watch phone is in the watch mode as illustrated in FIG. 4A, the controller 110 senses the watch mode in step 601 and thus turns off the touch screen panel 161 and turn on the display 162 in the display device 160 in step 602.

Upon selection of the mode selection key 127 in step 603, the controller 110 senses the input of the mode selection key 127 and switches the watch phone mode.

Upon receipt of an incoming call in step 604, the controller 110 senses the incoming call, turns on the touch screen panel 161, and keeps the display 162 on in step 605. After turning on the touch screen panel 161 in the display device 160 in step 605, the controller 110 displays the at least two areas 501 for call rejection and the at least two areas 502 for call connection on the display device 160, thus alerting the user of the incoming call in step 611.

After the mode selection key is input in step 603, or if the watch phone is in the idle mode in step 601, the controller 110 senses if the watch phone is in the idle mode in step 606 and turns on the touch screen panel 161 and the display 162 in the display device 160 in step 607, if in the idle mode.

Upon input of the mode selection key in step 608, the controller 110 senses the input of the mode selection key and switches the watch phone to the watch mode in step 601.

If the mode selection key is not input in step 608 and an incoming call is received in step 609, the controller 10 senses the incoming call. As illustrated in FIGS. 5A and 5B, the controller 110 controls the at least two areas 501 for call rejection and the at least two areas 502 for call connection to be displayed in the display device 160, thus alerting the user of the incoming call in step 611.

If the at least two areas 502 for call connection are pointed to or a drag happens between the at least two areas 502, the controller 110 senses the pointing or dragging in step 612 and connects the call in step 613. However, if the at least two areas 502 for call connection are pointed to or a drag happens between the at least two areas 502 in step 612 and the at least two areas 501 for call rejection are pointed to or a drag happens between the at least two areas 501, the controller 110 senses the pointing or dragging in step 614 and rejects the call in step 615.

More specifically, in FIGS. 5A and 5B, "1" and "2" are written in the two areas 502 for call connection in FIG. 5A. If "1" and "2" in the areas 502 are sequentially pointed to or a drag occurs from "1" to "2" during the call generation, the call is connected. Similarly, "2" and "1" are written in the two areas 501 for call rejection in FIG. 5A. If "1" and "2" in the areas 501 are sequentially pointed to or a drag occurs from "1" to "2" during the call generation, the call is rejected.

Referring to FIG. 5B, "Call" and "Yes" are written in the two areas 502 for call connection. If "Call" and "Yes" in the areas 502 are sequentially pointed to or a dragging occurs from "Call" to "Yes" during the call generation, the call is connected. Similarly, "Call" and "No" are written in the two areas 501 for call rejection. If "Call" and "No" in the areas 501 are sequentially pointed or a dragging occurs from "Call" to "No" during the call generation, the call is rejected.

If the mode selection key is not pressed in step 608 and an incoming call is not received in step 608, because the touch screen panel 161 is on in step 607, a menu may be selected by a user manipulation of the touch screen panel 161, and a function corresponding to the selected menu may be performed in step 610.

As described above, an inadvertent operation, such as an unintended input, is prevented by using two areas, which are pointed to or dragged between in order to reject or accept a call.

As is apparent from the description above, the above-described embodiments of the present invention provide a watch phone including a touch screen panel and a single key and a method for performing a call using the watch phone. Therefore, a call is easily performed despite a decrease in the number of external buttons, in case of a small-size terminal or a design-oriented terminal, such as a watch phone. Also, inadvertent operation of the touch screen panel is prevented.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A watch terminal comprising:
a display device including a touch screen panel for acting as an input device and a display for displaying user data;
a mode selection key for switching to a watch mode or idle mode; and
control circuitry configured to:
identify the watch mode in which the touch screen panel is inactive and time-related information is displayed on the display;
based on an input of the mode selection key in the watch mode, switch the idle mode in which the touch screen panel is active and information related to the idle mode of watch terminal is displayed on the display, and based on detecting an incoming call in the idle mode, display an incoming call-related information while displaying both a call connection indicator and a call rejection indicator on the display;
based on detecting the incoming call in the watch mode, activate the touch screen panel and display an incoming call-related information while displaying both a call connection indicator and a call rejection indicator on the display;
control connecting to the incoming call based on a first touch input comprising movement in a first direction from a first portion to a second portion of the call connection indicator while displaying the call rejection indicator; and
control rejecting the incoming call based on a second touch input comprising movement in a second direction opposite the first direction from a first portion to a second portion of the call rejection indicator while displaying the call connection indicator.

2. The watch terminal of claim 1, wherein the control circuitry is configured to control a function of the watch terminal corresponding to a manipulation of the touch screen panel when the touch screen panel is active.

3. The watch terminal of claim 1, wherein the call connection indicator comprises an indication of the first direction, and
wherein the call rejection indicator comprises an indication of the second direction.

4. The watch terminal of claim 3, wherein the first and second portions of the call connection indicator comprise first and second indicia at opposite ends of the call connection indicator to provide the indication of the first direction and the first and second portions of the call rejection indicator comprise third and fourth indicia at opposite ends of the call rejection indicator to provide the indication of the second direction.

5. The watch terminal of claim 1, configured for connection to a band.

6. The watch terminal of claim 1, wherein the call connection indicator and the call rejection indicator each comprises an elongated indicator.

7. The watch terminal of claim 1, wherein each of the first and second portions of the call connection indicator comprise respective first and second indicia and each of the first and second portions of the call rejection indicator comprise respective third and fourth indicia.

8. The watch terminal of claim 1, wherein the first touch input further comprises successively touching the first and second portions of the call connection indicator and the second touch input comprises successively touching the first and second portions of the call rejection indicator.

9. A method for a watch terminal comprising a display device including a touch screen panel for acting as an input device and a display for displaying user data, the method comprising:
identifying the watch mode in which the touch screen panel is inactive and time-related information is displayed on the display;
based on an input of a mode selection key of watch terminal in the watch mode, switching the idle mode in which the touch screen panel is active and information related to the idle mode of watch terminal is displayed on the display, and based on detecting an incoming call in the idle mode, displaying an incoming call-related information while displaying both a call connection indicator and a call rejection indicator on the display;

based on detecting the incoming call in the watch mode, activating the touch screen panel and displaying an incoming call-related information while displaying both a call connection indicator and a call rejection indicator on the display;

connecting to the incoming call based on a first touch input comprising movement in a first direction from a first portion to a second portion of the call connection indicator while displaying the call rejection indicator; and rejecting the incoming call based on a second touch input comprising movement in a second direction opposite the first direction from a first portion to a second portion of the call rejection indicator while displaying the call connection indicator.

10. The method of claim 9, further comprising:
turning off and on the touch screen panel based on an input of the mode selection key to the watch terminal.

11. The method of claim 9, further comprising:
performing a function of the watch terminal corresponding to a manipulation of the touch screen panel when the touch screen panel is active.

12. The method of claim 9, wherein the call connection indicator comprises an indication of the first direction, and wherein the call rejection indicator comprises an indication of the second direction.

13. The method of claim 12, wherein the first and second portions of the call connection indicator comprise first and second indicia at opposite ends of the call connection indicator to provide the indication of the first direction and the first and second portions of the call rejection indicator comprise third and fourth indicia at opposite ends of the call rejection indicator to provide the indication of the second direction.

* * * * *